United States Patent [19]
Hosaka et al.

[11] Patent Number: 5,171,955
[45] Date of Patent: Dec. 15, 1992

[54] WIRE-CUT ELECTROEROSION APPARATUS

[75] Inventors: Akio Hosaka, Sakai; Gen Itoh, Kanagawa; Hidehito Hori, Sabae; Yoshihiro Watanabe, Yokohama, all of Japan

[73] Assignee: Sodick Co., Ltd., Yokohama, Japan

[21] Appl. No.: 783,347

[22] Filed: Oct. 28, 1991

[30] Foreign Application Priority Data

| Oct. 26, 1990 [JP] | Japan | 2-290326 |
| Feb. 28, 1991 [JP] | Japan | 3-057814 |
| Apr. 9, 1991 [JP] | Japan | 3-103964 |

[51] Int. Cl.$^5$ .............................................. B23H 7/10
[52] U.S. Cl. .............................. 219/69.12; 219/69.14
[58] Field of Search ....................... 219/69.12, 69.14; 277/30; 285/24, 27

[56] References Cited

U.S. PATENT DOCUMENTS

| 4,101,148 | 7/1978 | Lee | 285/24 |
| 4,421,323 | 12/1983 | Burke | 277/30 |
| 4,589,689 | 5/1986 | Regan | 285/24 |
| 4,861,172 | 8/1989 | Annast et al. | 277/30 |
| 4,918,279 | 4/1990 | Babel et al. | 219/69.12 |
| 5,028,757 | 7/1991 | Aramaki et al. | 219/69.12 |
| 5,111,016 | 5/1992 | Lodetti et al. | 219/69.14 |

FOREIGN PATENT DOCUMENTS 137092  4/1985  European Pat. Off. ............... 277/30

Primary Examiner—Geoffrey S. Evans
Attorney, Agent, or Firm—Marks & Murase

[57] ABSTRACT

In a wire-cut EDM apparatus for cutting a workpiece (2) submerged in a processing tank (3) filled with a machining fluid (15), an opening (24) is made in the side wall of the tank through which an arm unit passes. A slide plate (14) also has an opening for passage of the arm unit and also prevents leakage from the space between the opening 24 and the arm unit. In one preferred embodiment a fluid flow between the slide plate and arm unit is used to prevent fluid in the tank from escaping through the space between the slide plate (14) and the arm unit. Alternatively, a low frictional member may be placed between the arm unit and the slide plate for axially sealing the arm unit. Frictional resistance from movement of the lower arm unit is reduced and machining accuracy improved.

27 Claims, 16 Drawing Sheets

FIG. 4
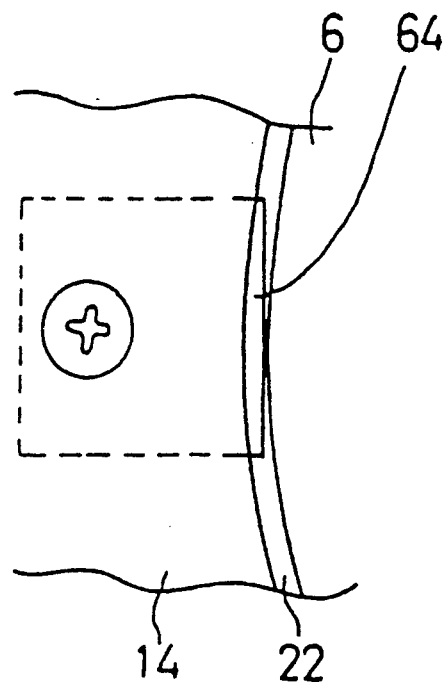
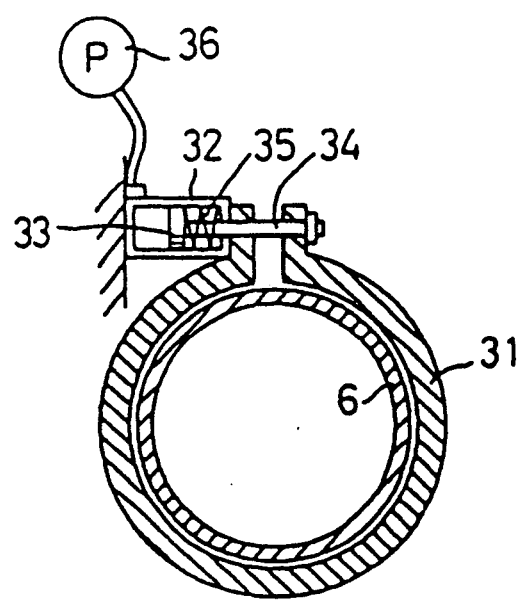
FIG. 5

FIG. 19
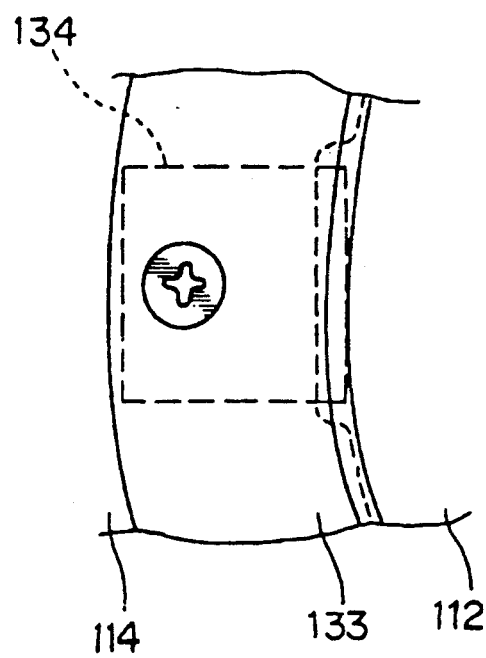
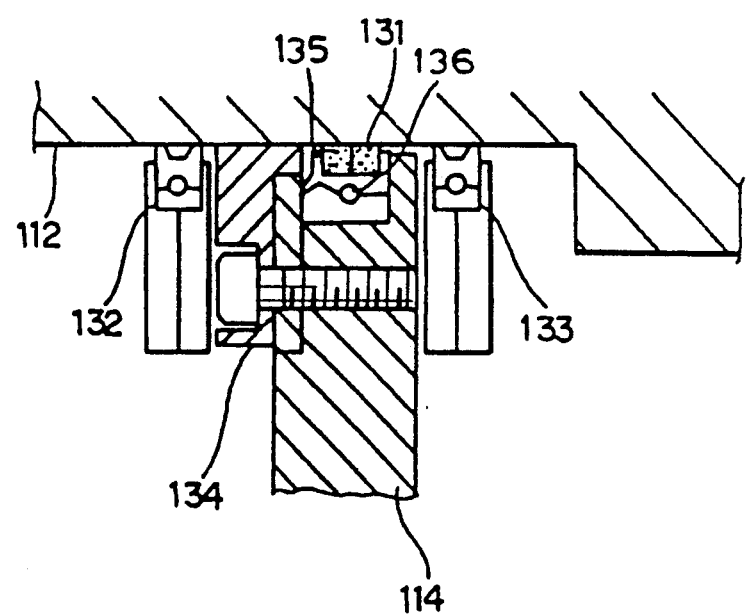
FIG. 20

WIRE-CUT ELECTROEROSION APPARATUS

FIELD OF THE INVENTION

The present invention relates generally to a wire-cut electroerosion apparatus. More specifically, the present invention relates to a wire-cut electrical discharge machining ("EDM") apparatus for performing submerged machining.

BACKGROUND OF INVENTION

In wire-cut EDM, electrical discharge machining may be performed with the workpiece submerged in a processing tank that is filled with a machining fluid. A wire electrode runs between an upper guide head and a lower guide head with the two guide heads mounted on an upper arm unit and a lower arm unit, respectively.

In such machines, an opening is made in the processing tank for inserting the lower arm unit with the lower guide head into the tank. Positioning of the workpiece relative to the wire electrode is accomplished by moving the processing tank in two orthogonal directions in a plane parallel to its base. One direction is parallel to the axis of the lower arm unit and the other direction is parallel to the tank wall having the opening.

In this type of wire-cut EDM apparatus, the space between the opening and the lower arm unit must be sealed to prevent leakage of the machining fluid from the processing tank. Various configurations for sealing proposed in the past are illustrated in U.S. Pat. No. 4,565,915 to Girardin, U.S. Pat. No. 4,918,279 to Babel et al., U.S. Pat. No. 4,647,747 to Goto, U.S. Pat. No. 4,808,786 to Shinkai, et al., and U.S. Pat. No. 4,992,640 to Tanaka, et al. As shown in FIG. 21, some of these conventional arrangements use a sealing plate 4 provided between the opening 3 and the lower arm unit 1. Sealing members are then placed between the sealing plate 4 and the wall of the processing tank 2 and also between the wall and the lower arm unit 1. The positioning of sealing members between the sealing plate 4 and the lower arm unit 1, however, creates a problem in terms of frictional resistance, also called the sealing resistance. Among other problems, the sealing resistance may cause the lower arm unit to deform thereby degrading machining accuracy.

SUMMARY OF THE INVENTION

An object of the present invention is to provide an electroerosion apparatus which reduces the sealing resistance to the arm unit and also improves the machining accuracy.

Another object of the invention is to provide a tank sealing system for an electroerosion apparatus which seals the arm unit when power is not supplied to the sealing system.

A further object of the present invention is to seal the arm unit without introducing unwanted bubbles into the machining area of the processing tank.

Another object of the present invention is to seal the arm unit without agitating the machining fluid at the machining location.

Another object of the present invention is to provide an electroerosion apparatus in which fluid is allowed to escape in a controlled flow.

A further object of the present invention is to provide an effective means for collecting machining fluid escaping from the tank and returning it to the processing tank.

Another object of the present invention is to provide an electroerosion apparatus in which a space between the arm unit and an adjacent member is maintained precisely.

Another object of the present invention is to provide an electroerosion apparatus in which the sliding resistance of the axial seal for the arm unit is minimized.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

The present invention generally relates to a wire-cut electrical discharge machining apparatus ("EDM") in which an opening is formed in the wall of the processing tank for passage of a lower arm unit. The processing tank is filled with a machining fluid for performing submerged machining operations on the workpiece. In one preferred embodiment injection nozzles associated with a sliding plate are provided to hydraulically "seal" the space between the arm unit and the opening in the processing tank wall. These injection nozzles inject a compressed fluid from the periphery of an opening in the slide plate towards the arm unit and the processing tank. In this arrangement, this energized flow of compressed fluid prevents fluid in the processing tank from escaping through the space between the slide plate opening and the arm unit. This arrangement reduces the sealing resistance against the arm unit, since no sealing members physically contact the arm unit. This, in turn, improves machining accuracy.

Preferably a shield plate is placed near the outlet of the injection nozzles to prevent the compressed fluid from flowing directly into the middle of the processing tank. The shield plate prevents the machining fluid from becoming agitated which further improves the machining accuracy. Additional structure may be advantageously provided to remove bubbles caused by the injection of compressed fluid and direct the bubbles toward the surface of the fluid and away from the machining area of the tank.

In accordance with a further preferred embodiment of the present invention, and in accordance with its objects and purposes, the wire-cut electrical discharge machining apparatus may also comprise a processing tank having an opening for the passage of a lower arm unit. A covering member, placed around the arm unit, covers the opening by sliding side-to-side with the arm unit. Machining fluid flows in the space between the covering member and the arm unit. A sub-tank may be provided for catching and recirculating the fluid flowing between the arm unit and the covering member. Also, the covering member may have a recessed portion connected to an aspirator for drawing in machining fluid. The sealing resistance between the slide plate and arm unit is reduced and machining fluid flow controlled.

In accordance with a further aspect of the present invention, and in accordance with its objects and purposes, a wire-cut EDM apparatus is provided comprising a processing tank having an opening for passage of a lower arm unit. A covering member is positioned around the arm unit and covers the opening by sliding side-to-side with the arm unit. A contact member may be connected to the covering member for contacting the arm unit. Advantageously, the contact member has a low coefficient of friction and supplies a low frictional axial seal with respect to the arm unit.

BRIEF DESCRIPTION OF THE DRAWINGS

The accompanying drawings, which are incorporated in and form a part of the specification, illustrate various embodiments of the present invention and, together with the description, serve to explain the principles of the invention. In the drawings:

FIG. 4 is an enlarged, fragmentary view of the positioning plate in FIG. 3;

FIG. 5 is a cross-sectional view showing one embodiment of the seal for when the power is cutoff;

FIG. 19 is an enlarged view showing the positioning plate in the sixth embodiment of the invention;

FIG. 20 is an enlarged cross-sectional view of the sealing arrangement in the sixth embodiment of the invention;

DETAILED DESCRIPTION OF THE PREFERRED EMBODIMENTS

Reference will now be made in detail to the presently preferred embodiments of the invention, examples of which are illustrated in the accompanying drawings.

Figure 1:
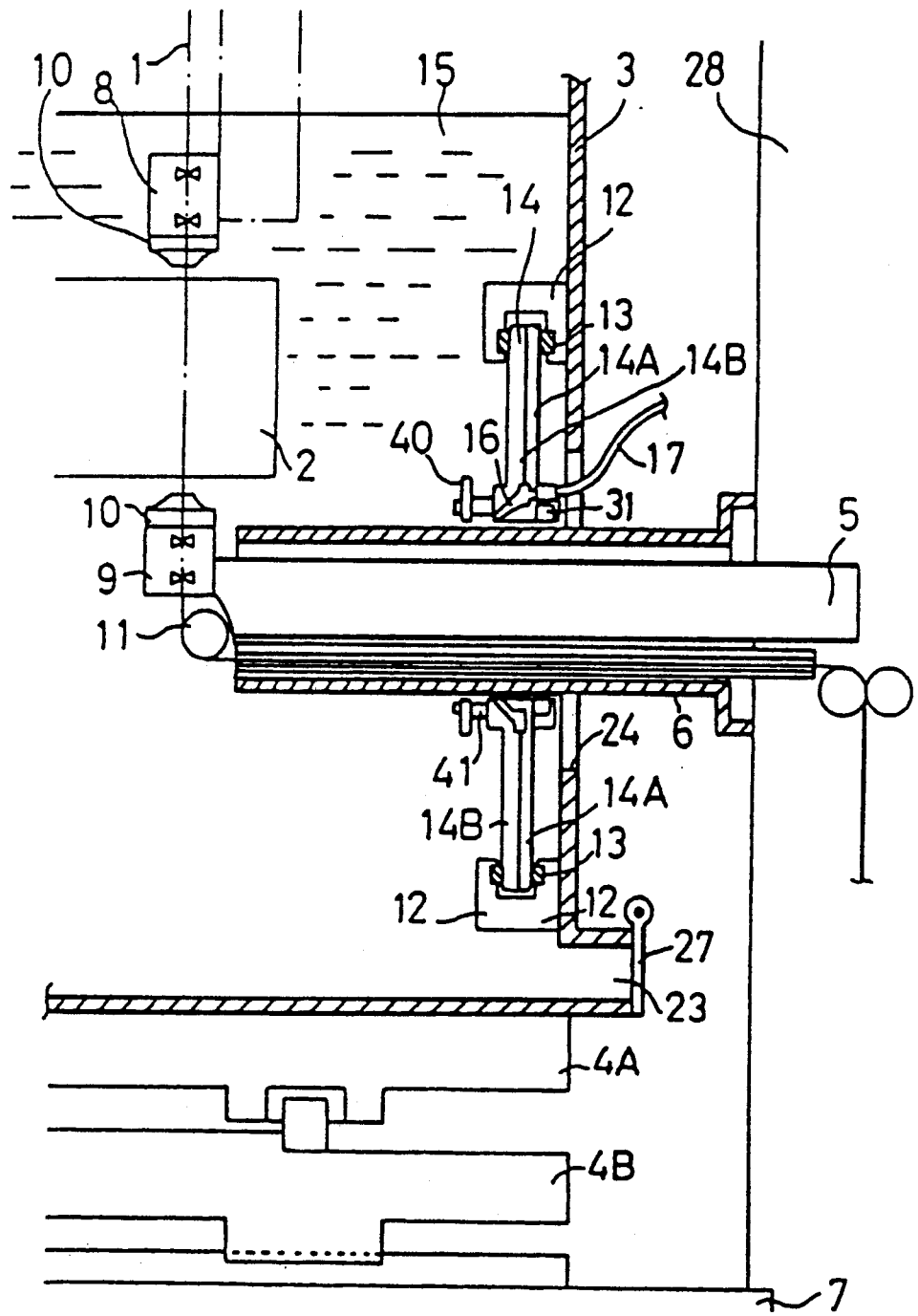
FIG. 1 is a cross-sectional view of one embodiment of the wire-cut EDM apparatus of the present invention.

FIG. 1 illustrates a cross-sectional view of one embodiment of the wire-cut EDM apparatus. In this embodiment, a workpiece 2 is submerged into a processing tank 3 filled with a machining fluid 15. A wire electrode 1 is guided from an upper guide unit 8 (schematically shown), to a lower guide unit 9 (schematically shown), to a pulley 11, and then through the inside of a pipe 6.

The processing tank 3 is supported by a table 4A and a saddle 4B that sits on a bed 7. The table 4A moves along an X-axis, which is in a direction parallel to the wall of the processing tank 3 having an opening 24, and the saddle 4B moves along a Y-axis, which is in a direction parallel to the axis of the pipe 6. This enables two-dimensional positioning of the processing tank 3 with respect to the workpiece 2.

The machining fluid 15 may be drained through the drain outlet 23 by the release of a drain valve 27. Each of the guide units 8 and 9 has an associated fluid flushing nozzle 10 (illustrated schematically). The upper guide unit 8 is supported by an upper arm (not illustrated) and the lower guide unit is supported by a lower arm unit 5. The lower arm unit 5 is positioned inside the cylindrical pipe 6 and both pas into the processing tank through the opening 24 in the wall of the tank 3. Hereinafter, the term "arm unit" will be used to refer to both the lower arm unit 5 and the pipe 6.

A slide plate 14 is positioned between the opening 24 of the processing tank 3 and the arm unit. Slide plate 14 may advantageously be generally rectangular in shape, having an opening at or about its center for passage of the arm unit. The slide plate 14 covers the opening 24 and serves as a sealing means. An outside edge of the slide plate 14 is attached to a plate holding guide 12 by a seal member 13. The plate holding guide 12 is connected to the inside wall of the processing tank 3.

Figure 2:
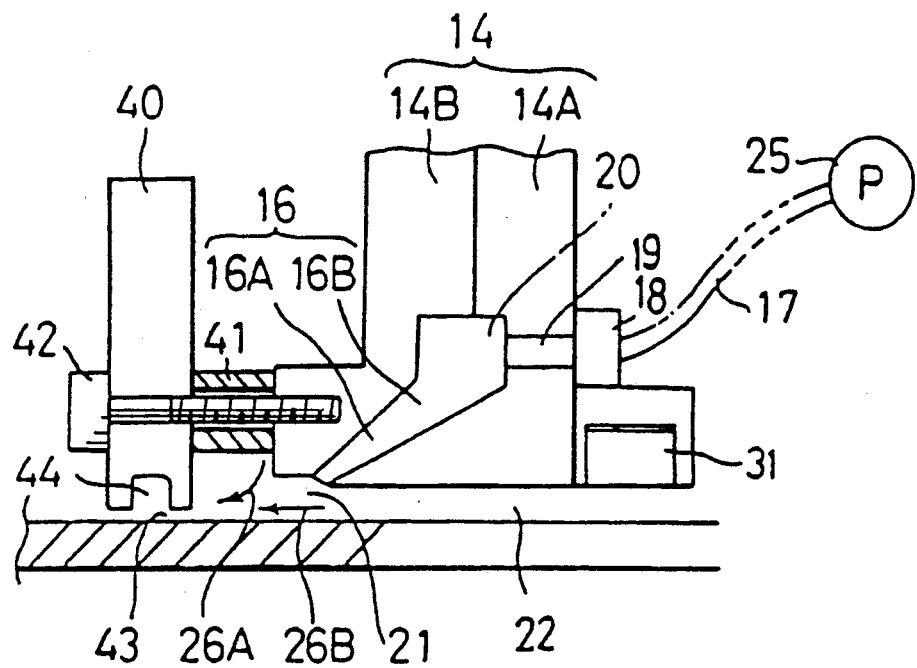
FIG. 2 is an enlarged, fragmentary cross-sectional view of the sealing arrangement in FIG. 1.

A plurality of injection nozzles 16 are located on the inside surface of the slide plate 14 facing the pipe 6. The injection nozzles 16 are best appreciated in the enlarged view of FIG. 2. As shown in FIG. 2, the slide plate 14 preferably comprises a pair of plates 14A and 14B positioned adjacent each other. The injection nozzle 16 and a compressor chamber 20 are formed in a space between the plates 14A and 14B, and a supply conduit 19 is formed in the plate 14B. The outlet of the nozzle 16 is disposed on the face of slide plate 14 near the periphery of the space between the arm unit and the face of the slide plate 14 which opposes the arm unit.

The injection nozzles 16 may be supplied with fluid under pressure by a pump 25 (indicated schematically) through supply pipe 17, pipe coupling 18, supply conduit 19, and compressor chamber 20. The pressurized fluid is preferably supplied from the pump 25 under the control of a valve, not shown, but which, as will be understood by the artisan, may be magnetically or electrically activated. Advantageously, the machining fluid may be used as the source for this pressurized fluid. The injection nozzles have a tip 16A which is narrower than the base 16B and is directed towards the inside of the processing tank 3 so that fluid may be forced into the processing tank 3.

The pressurized fluid creates a fluid flow, indicated by the arrow 26B, along the surface of the pipe 6 towards the inside 21 of the processing tank 3. This flow acts as a hydraulic curtain to prevent fluid in the tank 3 from escaping. As shown in FIG. 2, the fluid flows in the space between the pipe 6 and the edge of the slide plate 14. A second fluid flow, indicated by the arrow 26A, is created along the inside of slide plate 14. When the fluid flow 26A approaches the pipe 6, it merges with the fluid flow 26B. The confluence of the two flows 26A and 26B prevent fluid from leaking out of the space between the pipe 6 and the slide plate 14.

Should the velocity of the fluid flow from the injection nozzles 16 become excessively high, the machining performance will become degraded because an excessively high fluid flow velocity causes agitation of the machining fluid in the processing tank 3. This in turn could cause the wire electrode 1 to vibrate. Also, an excessively high velocity flow may draw air in from the space 22 and create air bubbles. The introduction of bubbles into the processing tank 3 may cause a reduction in the resistivity of the dielectric machining fluid.

Therefore in the embodiment of FIG. 2, a shield plate 40 is advantageously positioned downstream of the outlet of the nozzles 16. The shield plate 40 prevents the fluid in the tank 3 from becoming agitated and also prevents bubbles from being introduced into the tank. The shield plate 40 may be attached to the inside rim of the slide plate 14b by a bolt 42 and a washer 41. The washer 41 spaces the shield plate 40 from the slide plate 14. Thus, the shield plate 40 is placed near the outlet of the injection nozzle 16 and parallel to the slide plate 14. Although varying with the fluid injection pressure, the length of the washer 41 is preferably on the order of at least 3 mm. A relief groove 44 is preferably machined into the inside edge of the shield plate 40 for enhancing the buffering function of the injected fluid. The space 43 between the shield plate 40 and the pipe 6 is narrower than the spaces 21 and 22, preferably the space 43 is on the order of from about 0.2 mm to 1.0 mm.

Figure 3:
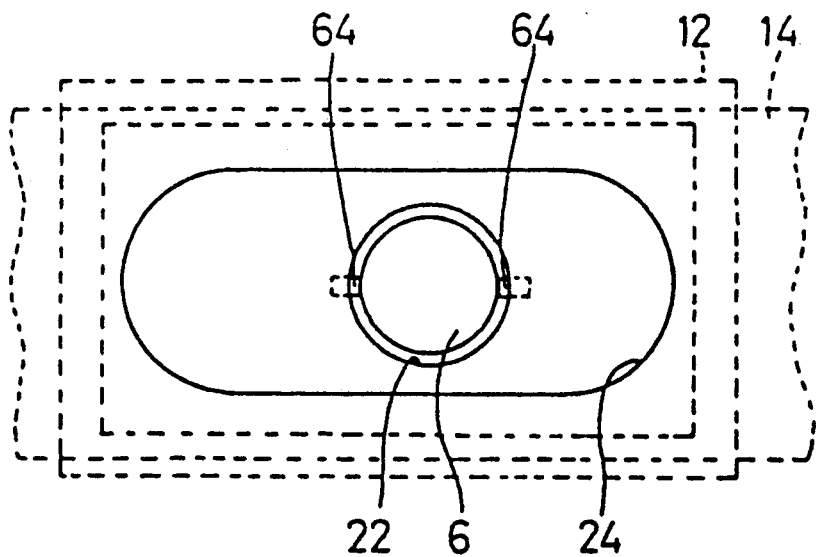
FIG. 3 is a partial front view of the embodiment of FIG. 1.

The spaces 21 and 22 should preferably be maintained as precisely as possible for the proper control of the fluid flow. Since the arm unit does not move up or down, the pipe 6 and the slide plate 14 can be kept in their initial position. The arm unit, however, does move to the right and left. Therefore, the slide plate 14 must also move in order to maintain this spacing. Therefore, as shown in FIG. 3, a positioning plate 64 is provided on both sides of the arm unit to maintain the spaces. As best seen in FIG. 4, the positioning plate 64 may be fastened to the slide plate 14 by screws with the tip of the plate 64 touching the pipe 6. The positioning plate 64 causes the slide plate 14 to move with the pipe 6 while maintaining the size of the spaces 21 and 22.

As will be apparent to the artisan from reading the above, absent any additional sealing structure, whenever the power supplied to the wire-cut EDM apparatus is cut off, the supply of pressurized fluid from the pump 25 will stop, thereby permitting machining fluid 15 to drain through the space between the slide plate 14 and the pipe 6.

Machining fluid 1 could be drained through the drain outlet 23 whenever a working operation is finished. However, this is not a very efficient mode of operation. Therefore, the use of additional sealing structure is desirable.

Figure 6:
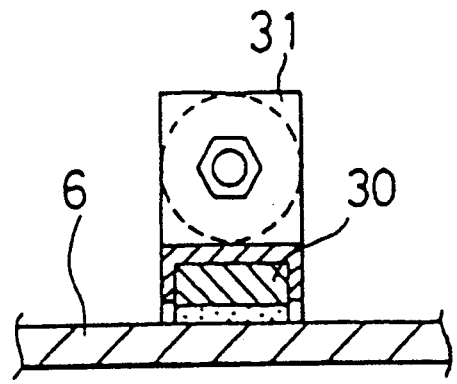
FIG. 6 is an enlarged, fragmentary cross-sectional view of the seal shown in FIG. 5.
Figure 7:
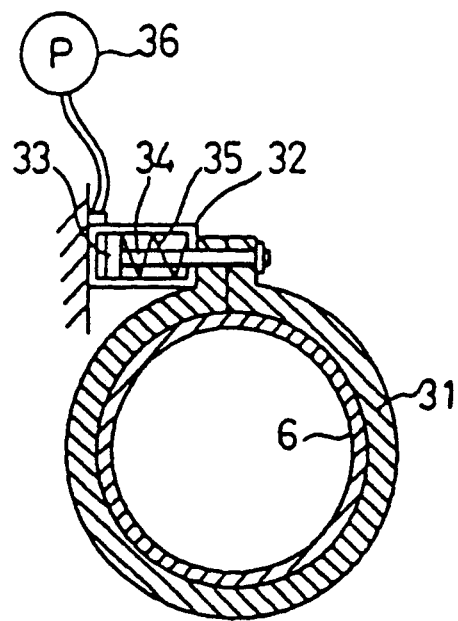
FIG. 7 is a cross-sectional view showing the sealed state of the seal in FIG. 5.

In one embodiment, as shown in FIGS. 5 through 7, this additional sealing means may comprise a clamp band 31 having a sealing ring 30 attached to its inside perimeter. FIG. 5 depicts the clamp band 31 in its open, non-sealing position, while FIG. 7 depicts the clamp band 31 in its closed, sealing position. In the sealing position, the sealing ring 30 is firmly attached to the pipe 6, thereby sealing the space between the pipe 6 and the clamp band 31. The clamp band 31 is connected to the outer wall of the slide plate 14. A cylinder 32 is attached to the slide plate 14 and houses a piston 33, part of a piston rod 34, and a spring 35.

The operation of the sealing means is as follows. When power is supplied to the EDM apparatus, a pump 36 pushes the piston 33 to its open position as shown in FIG. 5. When the power is cut off, the spring 35 forces the piston back to its closed, sealing position as shown in FIG. 7. By having the spring 35 push the piston 33 into its closed, sealing position, the clamp band 31 tightens around the pipe 6 and seals the space without consuming any energy. Alternatively, compressed air may be used in place of the spring 35 for the clamping purpose.

Figure 8:
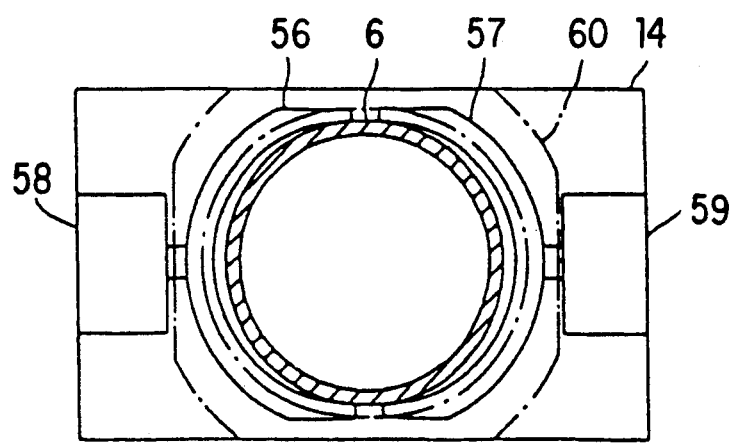
FIG. 8 is a partial front view showing a second embodiment for the seal for when the power is cut off.

A further embodiment of this sealing means is shown in FIG. 8. In this embodiment, the space around the pipe 6 is sealed with two clamp halves 56 and 57. The clamp halves 56 and 57 are in the shape of two symmetrical semicircular arcs. A pair of cylinders 58 and 59 respectively press the clamp halves 56 and 57 against the pipe 6 and the holding plate 60, thereby sealing the space between the side plate 14 and pipe 6. In this embodiment, an efficient and uniform sealing condition is obtained by the use of two symmetrical clamp halves.

Figure 9:
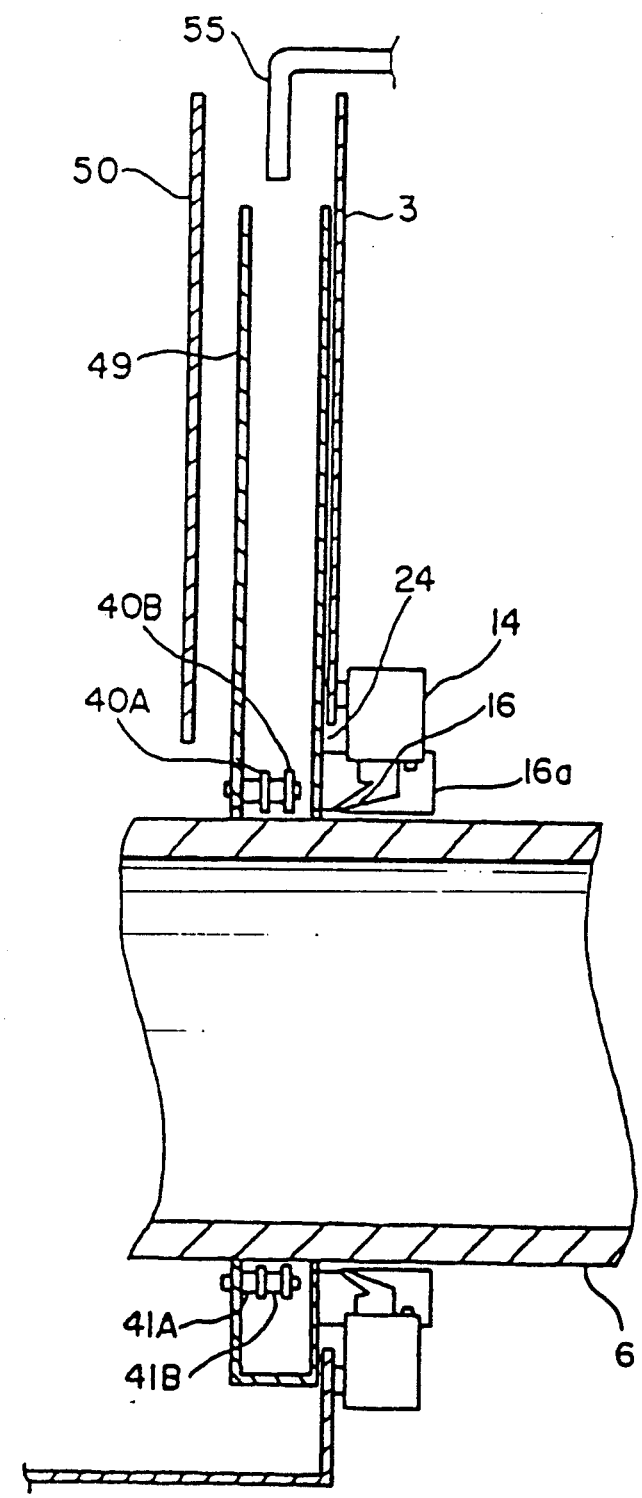
FIG. 9 is a cross-sectional view showing a second embodiment of the seal of the present invention.
Figure 10:
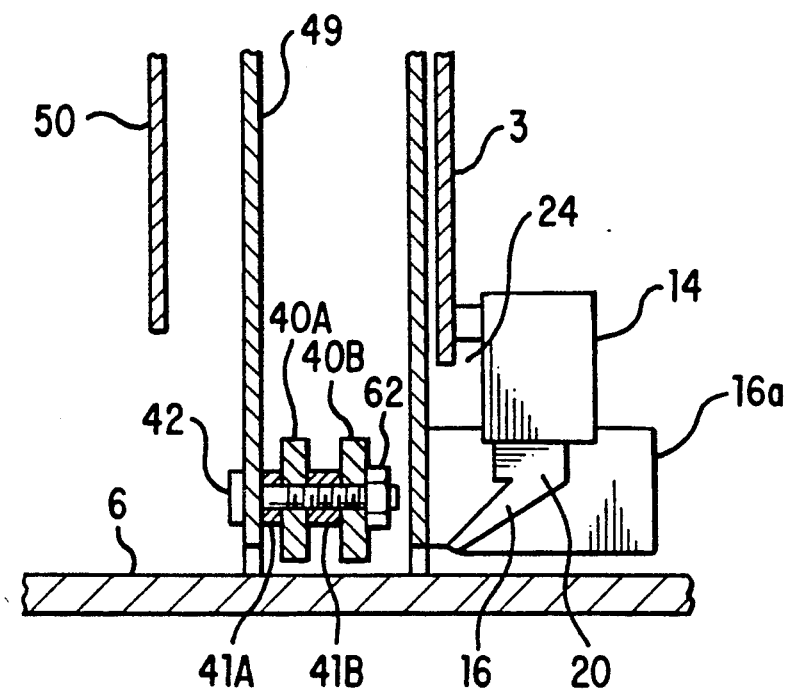
FIG. 10 is an enlarged, fragmentary cross-sectional view showing the sealing arrangement of FIG. 9.

Another embodiment of the present invention is shown in FIGS. 9 and 10. Reference numerals used in FIGS. 9 and 10 that are also found in the other embodiments depict similar elements. In this embodiment, the slide plate 14 is positioned to the outside of the processing tank 3. The unit 16a of the injection nozzle 16 is formed independently of the slide plate 14 and is fastened onto the slide plate 14.

Figure 11:
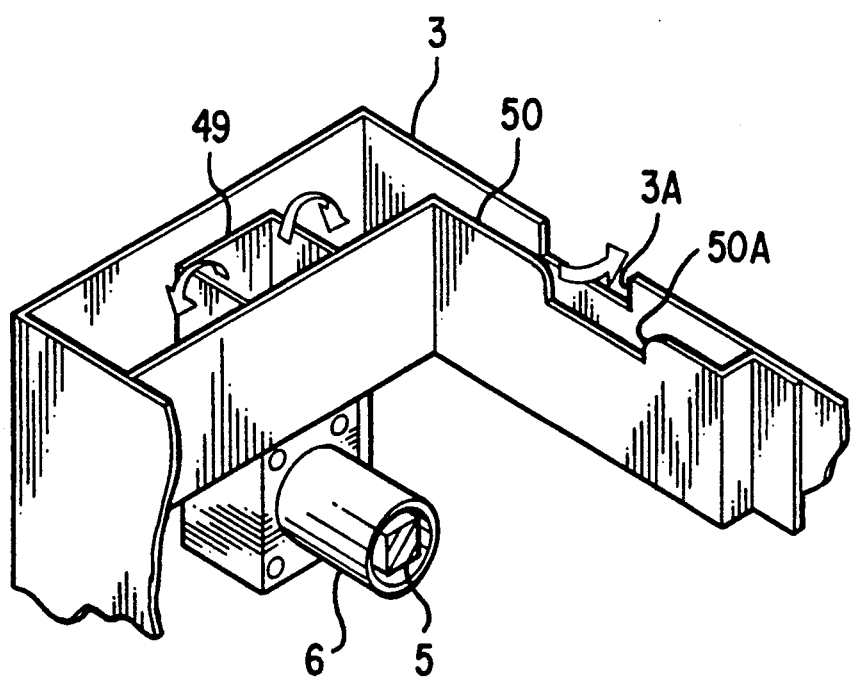
FIG. 11 is a perspective view showing the positioning of the prism unit and the partition plate in the embodiment of FIG. 9.

Additionally, as shown in FIG. 11, a prism unit 49 may be provided in the processing tank 3. The prism unit 49 provides a fluid "room" which surrounds the shield plates 40A and 40B. The prism unit 49 preferably has a square-shaped cross section with an opened upper end and a lower end closed by a bottom plate. The arm unit penetrates the tank wall through an opening in the lower portion of the prism unit 49. As best seen in FIGS. 9 and 10, the prism unit 49 has shield plates 40A and 40B positioned inside it. Shield plates 40A and 40B are preferably fastened to the prism unit 49 by means of bolt 42, washers 41A and 41B, and nut 62. As shown in FIGS. 9 through 11, a partition plate 50 is fastened to the walls of the processing tank 3. The partition plate 50 preferably extends below the surface of the machining fluid and partitions only an upper layer of the fluid. As will be understood by the artisans, similar structure can be used with the embodiment of FIGS. 1 and 2.

The prism unit 49 and partition plate 50 create a fluid room which leads any bubbles generated by the injected tank sealing fluid upward toward the surface of the machining fluid. The partition plate 50 prevents bubbles from disbursing throughout the tank 3. The shield plates 40A and 40B provide efficient shielding between the fluid injected from the injection nozzles 16 and the wire electrode. Weirs 3A and 50A (FIG. 11) are provided in the wall of the processing tank 3 and in the partition plate 50 to maintain the machining fluid surface at a desired level.

In this embodiment, most of the fluid injected from the injection nozzle 16 passes upward through the prism unit 49. Any bubbles mixed in with the fluid dissipate at the surface of the fluid. This structure prevents the bubbles from returning down into the processing tank where they might degrade machining performance.

Advantageously, a suction device may also be included in the processing tank 3. As shown in FIG. 9, suction pipe 55 may be inserted into the machining fluid from above the processing tank 3 and prism unit 49. This suction pipe 55 is connected to a suction device to draw off gas from the dissipating bubbles at the surface of the fluid in the prism unit 49. The suction pipe 55 and suction device preferably includes a filtering unit (not shown) for separating the bubbles from the machining fluid, the latter being returned to the processing tank 3 or fluid reservoir. As will be apparent to the artisan, the suction device and suction pipe 55, are not essential as most bubbles will be sufficiently eliminated by the prism unit 49.

Figure 12:
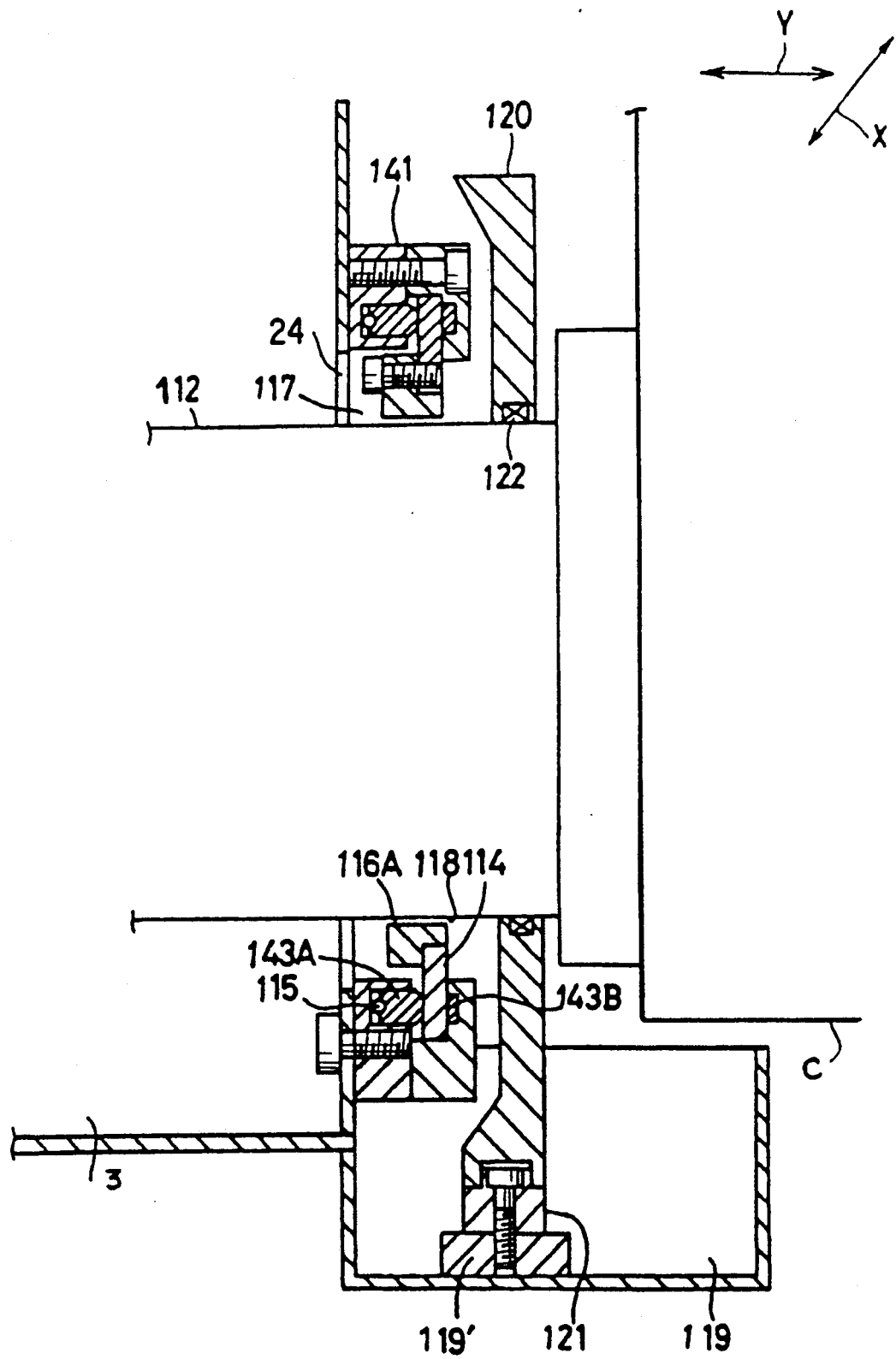
FIG. 12 is a cross-sectional view of a third embodiment of the invention.
Figure 13:
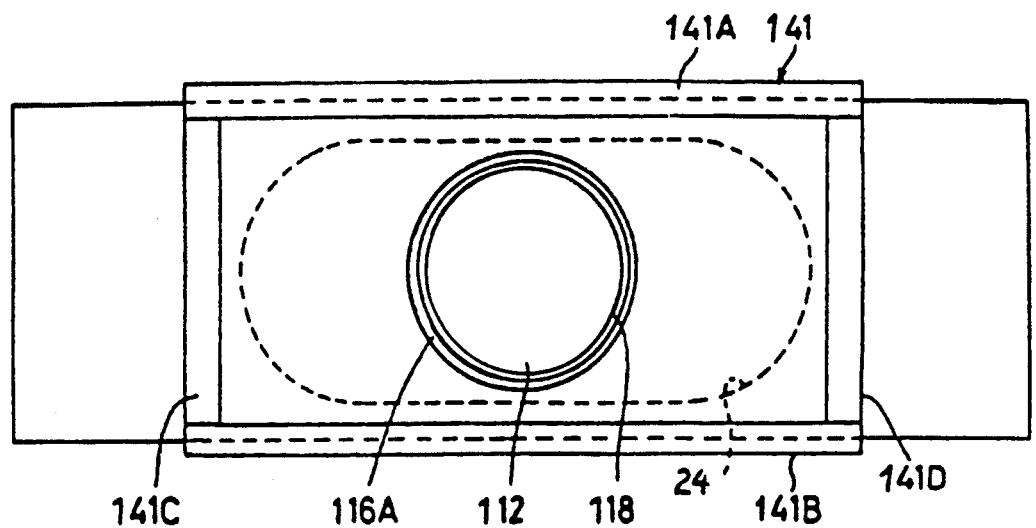
FIG. 13 is a cross-sectional side view of the third embodiment of the invention.

A third embodiment of the invention, shown in FIGS. 12 and 13, includes a processing tank 3 having an opening 24 in one of its walls. In this embodiment a non-loading, axial sliding seal is used. The opening 24 is closed by a covering member 114. The covering member 114 comprises a plate-like member having a through hole for passage of a lower arm unit 112. The lower arm unit 112 is supported by the column C and extends into the processing tank 3.

The covering member 114 fits inside a guide frame 141, which is secured to the wall of the processing tank 3, for example by screws. Two seals, 143A and 143B, seal the covering member 114 with respect to the guide frame 141 while allowing the covering member 141 to move in the X axis direction as indicated in FIG. 12.

An annular member 116A is secured to one end of the covering member 114. The member 116A creates an annular space 118 with respect to the arm unit 112. Preferably, the space 118 is on the order of about 0.05 to 0.1 mm.

A sub-tank 119 is positioned beneath the processing tank 3 and covering member 114. The sub-tank 119 collects machining fluid passing through the annular space 118. While its capacity will vary depending on the size of the tank 3 and other factors, for a typical wire-cut EDM installation the capacity of the sub-tank 119 is preferably on the order of about 3 liters.

A shield plate 120 is positioned behind the covering member 114 and moves along the X axis with the arm unit 112. The shield plate 120 moves along a guide member 121, which is fastened to a guide rail 119' positioned at the bottom of the sub-tank 119. The shield plate 120 has an opening through which the arm unit 112 passes.

A seal 122 is used to prevent the machining fluid from flowing to the column side of the shield plate 120. The seal 122 preferably only applies a very slight contact pressure against the arm unit 112 to avoid applying a load to the arm unit 112 during motion of the processing tank 3.

As best seen in FIG. 13, the guide frame 141 is preferably rectangularly shaped and includes sides 141A, 141B, 141C, and 141D which surround the opening 24 in the processing tank 3. The annular member 116A, discussed above, is concentrically disposed with respect to the lower arm unit 112, thereby forming the annular space 118.

The operation of the embodiment of FIGS. 12 and 13 is as follows. Because the annular member 116A does not seal against the arm unit 112, when the tank 3 is full, machining fluid will flow through the space 118. The shield plate 120 directs the machining fluid into the sub-tank 119. From the sub-tank 119, the machining fluid is recycled into the processing tank 3 through a suitable hose or duct. This sealing device 122 provides a low-frictional resistance to the arm unit 112 when it is moved axially. As a result, the ar unit 112 may be smoothly positioned and working accuracy improved.

Figure 14:
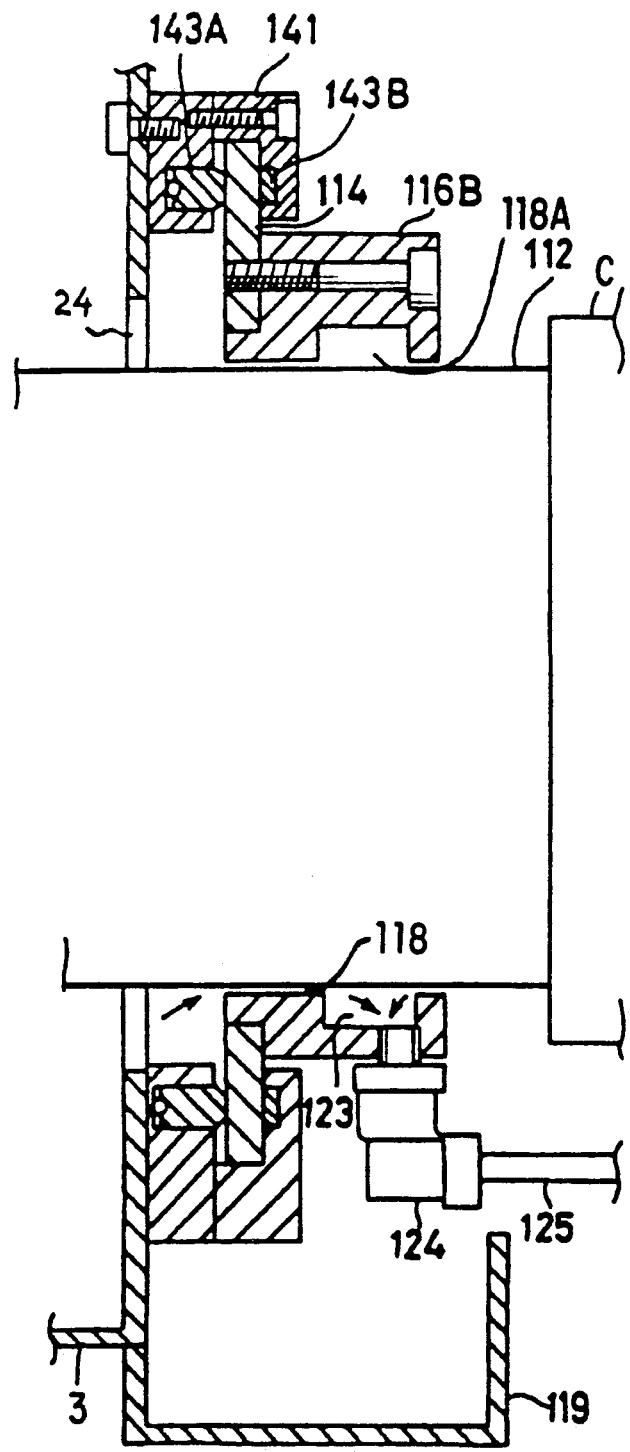
FIG. 14 is a cross-sectional view of a fourth embodiment of the invention.

FIG. 14 illustrates a fourth embodiment of the invention and represents a variation on the embodiment of FIGS. 12 and 13. In this embodiment, an annular member 116B is secured to the covering member 114. The annular member 116B is configured to form a space 118A between it and the arm unit 112. An elbow unit 124 positioned at a drain opening at the lower end of the annular member 116B at a recessed portion 123 thereof feeds into pipe 125. The elbow unit 124 and pipe 125 form part of an aspirator unit. Machining fluid flowing through the space 118 into the space 118A is aspirated through the elbow unit 124 and pipe 125. A sub-tank 119, described above with respect to FIGS. 12 and 13, may also be provided in case the flow through the spaces 118 and 118A is greater than the intake capacity of the aspirator. Machining fluid aspirated through the pipe 112 or drained from the sub-tank 19 may then be returned to the processing tank 3 or other fluid reservoir. Since the machining fluid is allowed to freely flow through the spaces 118 and 118A, axial sliding resistance on the arm 112 is reduced and the machining accuracy improved.

Figure 15:
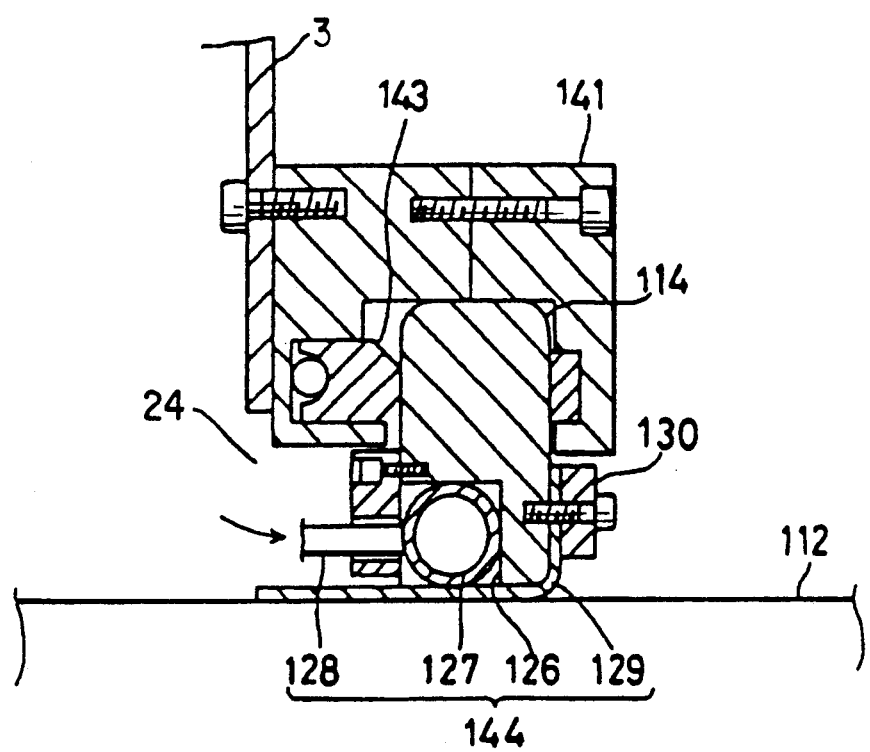
FIG. 15 is a cross-sectional view of a fifth embodiment of the invention.
Figure 16:
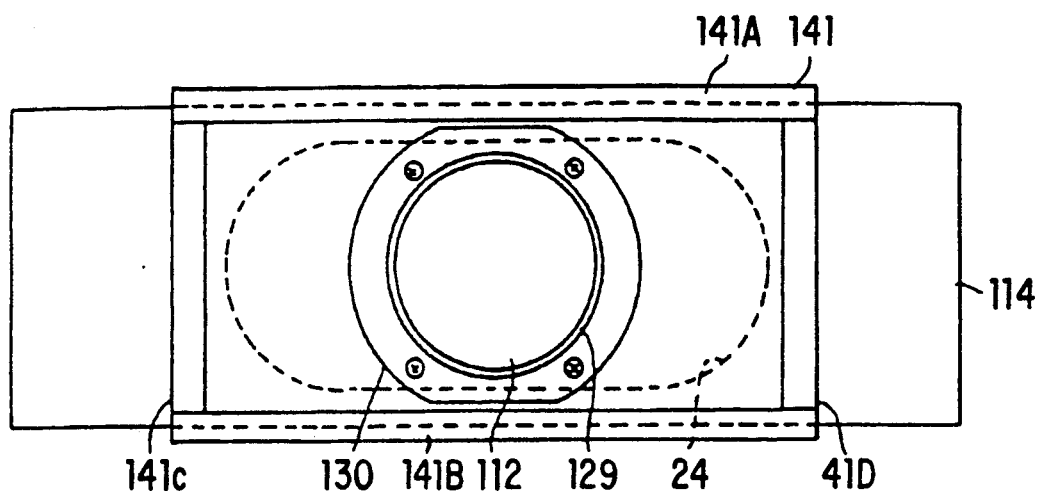
FIG. 16 is a side view of the fifth embodiment of the invention.
Figure 17:
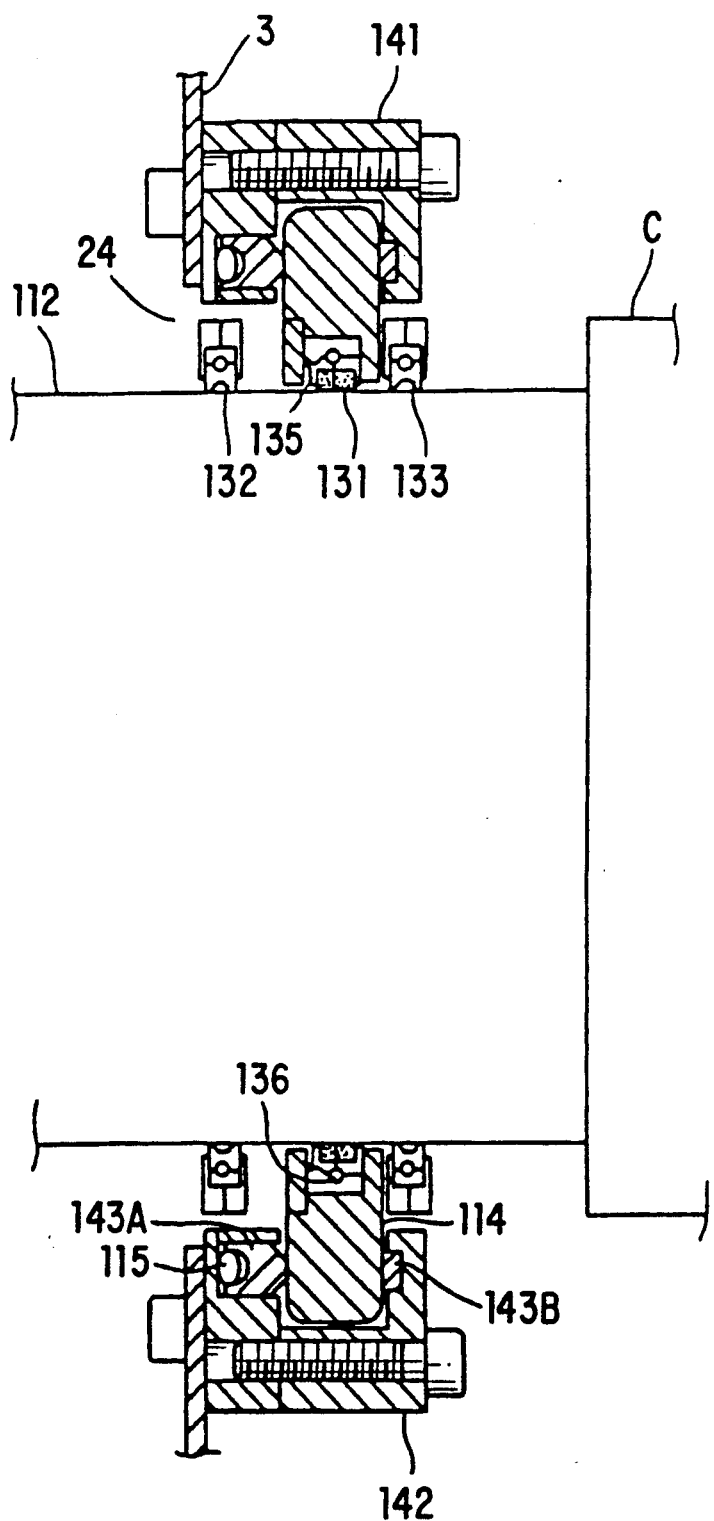
FIG. 17 is a cross-sectional view of a sixth embodiment of the invention showing the use of "mudguard" packing.

FIGS. 15 and 16 illustrate a fifth embodiment of the invention which represents a variation of the embodiment of FIGS. 12 and 13. In this embodiment, the covering member 114 includes a recessed portion 126 in which an elastic tube 27 is positioned. A slide sheet 129 is fastened to the covering member 114, preferably by a holding plate 130. As will be understood by one of skill in the art, the slide sheet 129 should have a low coefficient of friction and may, for example, comprise a layer of polytetraflouroethylene on the order of 0.5 mm in thickness. The pressure inside the elastic tube 127 may be controlled by use of a pipe 128 to ensure minimal sliding resistance between the arm 112 and slide sheet 129 consistent with adequate sealing. A supply of compressed air or pressurized fluid may be supplied to the elastic tube 127.

FIGS. 17 through 20 illustrate a sixth embodiment of the invention which represents yet another variation of the embodiment of FIGS. 12 and 13. In this embodiment, a packing 131, preferably formed of a low coefficient of friction material such as polytetraflouroethylene-soaked fibers in the form of a piece of cloth or felt, is contained in a recess in a cap 135. The cap 135 is preferably positioned in a notch provided in the covering member 114. The cap 135 is also preferably of a low friction material such as polytetraflouroethylene. An elastic member 136 positioned between the covering member 114 and the cap 135, preferably around the entire perimeter of the cap, to bias the cap 135 and packing 131 against the arm unit 112. The member 136 should be selected to exert minimal bias to seal while minimizing sliding resistance on the arm unit.

A mudguard packing or dam 132, is positioned on the arm unit 112 between the processing tank 3 and the packing 131. The mud guard packing 132 inhibits any particles deposited on the ar unit 112 from reaching the packing 131. Another dam, in the form of drain packing 133 may be advantageously positioned on the arm unit 112 behind the packing 131 to prevent an machining fluid passing the packing 131 from contacting the column C.

Figure 18:
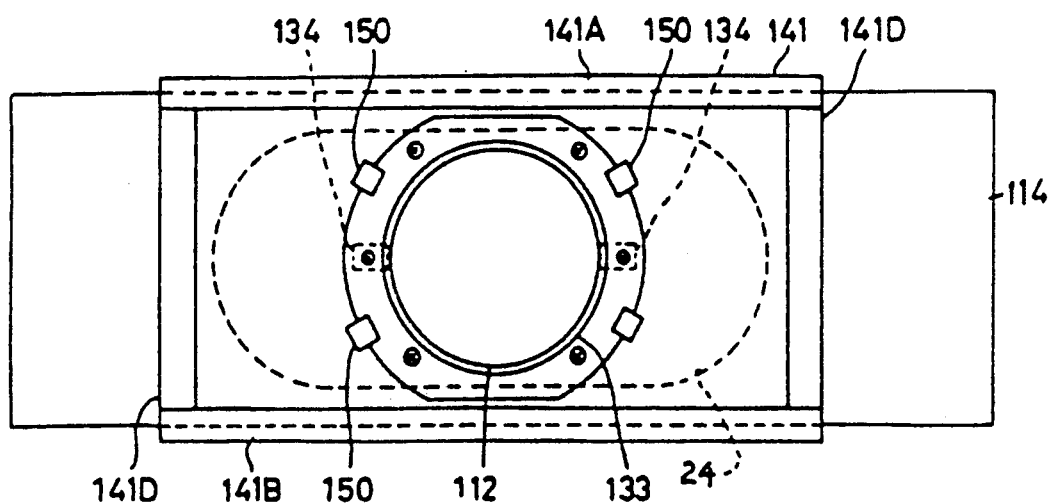
FIG. 18 is a side view of the sixth embodiment of the invention.
Figure 21:
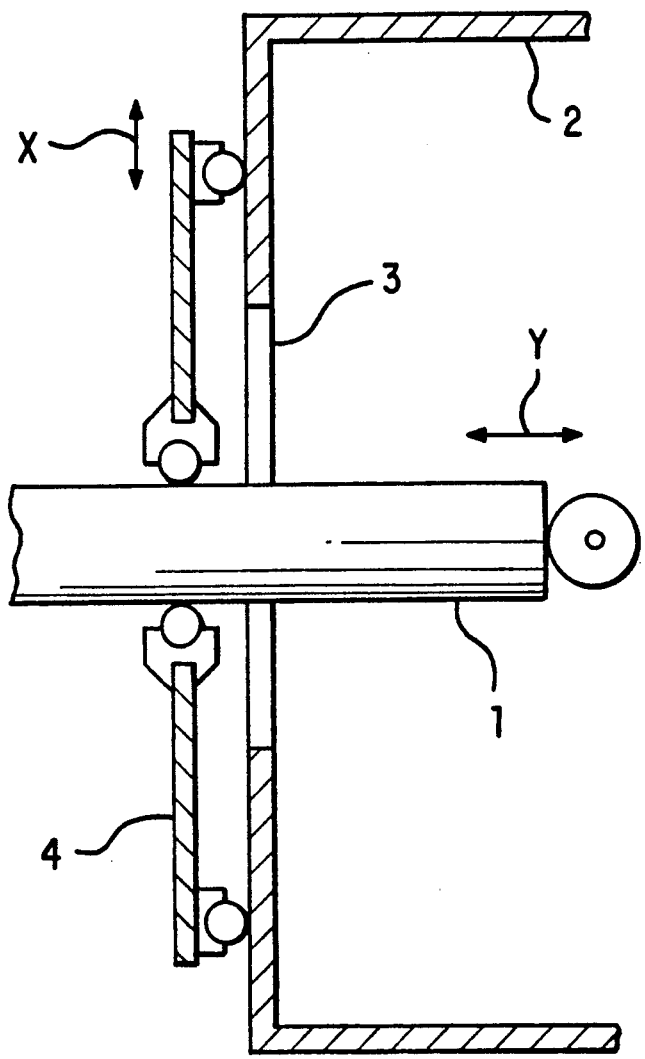
FIG. 21 is a cross-sectional view of a conventional sealing apparatus for an EDM machine.

As shown in FIG. 18, a plurality of binding members 150 may be secured to the covering member 114 for supporting the first dam, i.e., mudguard packing 132 and the second dam, i.e., drain packing 133. Positioning plates 134 may also be secured to the covering member 114. As best seen in FIG. 19, the positioning plates 134 maintain the spacing between the covering member 114 and the arm unit 112. The positioning plates 134 may also be used in the third through fifth embodiments described above.

This embodiment allows the arm unit 112 to move from side to side and also axially while maintaining a axial seal which has a low coefficient of friction.

The foregoing description of preferred embodiments of the invention have been presented for purposes of illustration and description. It is not intended to be exhaustive or to limit the invention to the precise form disclosed, and obviously many modifications and variations are possible in light of the above teaching. For example, in a power cut off situation, a shield plate may be provided in the rear of the slide plate 14 so that any fluid that leaves the opening 24 may be led to a supplemental tank as quickly as possible. Various modifications may also be made to the power cut off sealing embodiments. Also, the invention is not intended to be limited to the described structures for collecting and recirculating fluid from the work tank as other devices may also advantageously be used. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A wire-cut electroerosion apparatus having a wire electrode for machining a workpiece comprising:
   a processing tank for containing machining fluid, said tank including at least one side wall with an opening therein;
   an arm unit positioned in said opening, said arm unit having a longitudinal axis and being movable with respect to said tank in two orthogonal directions, one of which is in a direction parallel to said one side wall and the other of which is in a direction parallel to the axis of said arm unit;
   a plate member having a passageway sized to freely pass said arm unit, said plate member operating to seal the opening in said side wall; and
   means for injecting fluid around the periphery of said arm unit in the vicinity of the passageway in said plate member whereby said plate member and said means for injecting fluid operate to maintain the volume of the machining fluid in said tank at a substantially constant level while permitting said arm unit to move in said orthogonal directions thereby preventing machining fluid from flowing out through the passageway in said plate member while maintaining the arm unit essentially free of axial sliding resistance.

2. The wire-cut electroerosion apparatus of claim 1, wherein said means for injecting comprises a plurality of injection nozzles formed around said arm unit near said periphery for injecting fluid on said arm unit and in said tank.

3. The wire-cut electroerosion apparatus of claim 2, wherein said plate member comprises at least two pieces which cooperate to form a space in said plate and wherein said injection nozzles are formed by said spaces in said pieces.

4. The wire-cut electroerosion apparatus claim 2, wherein said plate member comprises at least two pieces which cooperate to form a space in said plate and wherein said injection nozzles are positioned in said spaces in said pieces.

5. The wire-cut electroerosion apparatus of claim 1, wherein said plate member moves along said one direction with said arm unit.

6. The wire-cut electroerosion apparatus of claim 2 further comprising a second plate member positioned downstream of the outlets of said injection nozzles.

7. The wire-cut electroerosion apparatus of claim 6, wherein said second plate member is rigidly attached to first-mentioned plate member and spaced a first distance downstream of the outlet of said injection nozzles, further comprising means for maintaining a generally constant spacing between said plate member and said arm unit and between said second plate member and said arm unit while said arm unit moves relative to said tank.

8. The wire-cut electroerosion apparatus of claim 6, further comprising means for maintaining a generally constant spacing between said plate member and said arm unit and between said second plate member and said arm unit while said arm unit moves relative to said tank.

9. The wire-cut electroerosion apparatus of claim 8, wherein said means for spacing further maintains a generally instant spacing between said second plate member and said arm unit while said arm unit moves relative to said tank.

10. The wire-cut electroerosion apparatus of claim 6, wherein said second plate member is positioned in the processing tank and in a space partitioned from the remainder of the work tank by at least one wall member, said partitioned space being operable to capture bubbles introduced into the work tank with said injected fluid.

11. The wire-cut electroerosion apparatus of claim 10 and further comprising a suction pipe for drawing off gas from the bubbles.

12. The wire-cut electroerosion apparatus of claim 1 and further comprising means operable to close the space between said plate member and said arm unit when the power to said apparatus is cut off.

13. The wire-cut electroerosion apparatus of claim 12, wherein said closing means comprises a clamp having a first opened, non-sealing position when power is supplied to said apparatus and a second closed, sealing position when power to said apparatus is cut off.

14. The wire-cut electroerosion apparatus of claim 13 further comprising means for opening said clamp when power is supplied to said apparatus and a means for closing said clamp when the power to the apparatus is cut off.

15. The wire-cut electroerosion apparatus of claim 12, wherein said closing means comprises two clamp halves which press against said arm unit to close the space between the plate member and arm unit when power to the apparatus is cut off.

16. A wire-cut electroerosion apparatus having a wire electrode for machining a workpiece comprising:
   a processing tank for containing machining fluid, said tank including at least one side wall with an opening therein;
   an arm unit positioned in said opening, said arm unit having a longitudinal axis and being movable with respect to said tank in two orthogonal directions, one of which is in a direction parallel to said one side wall and the other of which is in a direction parallel to the axis of said arm unit;
   a plate member having a passageway sized to freely pass said arm unit;

an annular member attached to said plate and positioned in said passageway, said annular member being sized to pass said arm unit without contacting it for thereby maintaining said arm unit essentially free of axial sliding resistance whereby a controlled flow of fluid out of said tank occurs; and means for containing said controlled flow of fluid out of said tank.

17. The wire-cut electroerosion apparatus of claim 16, wherein said containing means comprises a subtank and a plate member connected to said arm unit for guiding said fluid flow into said subtank.

18. The wire-cut electroerosion apparatus of claim 16, wherein said containing means comprises an aspirator for drawing off said fluid flow.

19. The wire-cut electroerosion apparatus of claim 18, wherein said annular member includes an annular recess and said aspirator is connected to draw fluid from said annular recess.

20. A wire-cut electroerosion apparatus comprising:
a processing tank for containing machining fluid and having at least one side wall with an opening therein;
an arm unit positioned in said opening, said arm unit having a longitudinal axis and being movable with respect to said tank in two orthogonal directions, one of which is in a direction parallel to said one side wall and the other of which is in a direction parallel to the axis of said arm unit;
a plate member having a passageway sized to freely pass said arm unit;
means for providing a generally fluid-tight seal between said plate member and said arm unit, said means comprising a member connected to said plate member for contacting said arm unit and an adjustable bias operable to minimize the axial sliding resistance between said arm unit and said member for contacting said arm unit.

21. The wire-cut electroerosion apparatus of claim 20, wherein said member for contacting said arm unit has a low coefficient of friction.

22. The wire-cut electroerosion apparatus of claim 20, wherein said member for contacting said arm unit comprises a thin sheet having a polytetraflouroethylene impregnated surface.

23. The wire-cut electroerosion apparatus of claim 22, wherein said adjustable bias member comprises an inflatable tube positioned to bias said thin sheet against said arm unit.

24. A wire-cut electroerosion apparatus comprising:
a processing tank for containing machining fluid and having at least one side wall with an opening therein;
an arm unit positioned in said opening, said arm unit having a longitudinal axis and being movable with respect to said tank in two orthogonal directions, one of which is in a direction parallel to said one wall and the other of which is in a direction parallel to the axis of said arm unit;
a plate member having a passageway sized to freely pass said arm unit;
means for providing a generally fluid-tight seal between said plate member and said arm unit, said means comprising a member connected to said plate member for contacting said arm unit and an adjustable bias operable to minimize the axial sliding resistance between said arm unit and said member for contacting said arm unit; and
further comprising a first dam positioned on said arm unit between the processing tank and said member for contacting the arm unit, said first dam being operable for inhibiting particles produced during machining from travelling along said arm unit to said member for contacting the arm unit.

25. The wire-cut electroerosion apparatus of claim 24, further comprising a second dam positioned on said arm unit on the opposite side of said member for contacting the arm unit from said first dam, said second dam operable for inhibiting moisture on said arm unit from leaving said processing tank.

26. A wire-cut electroerosion apparatus comprising:
a processing tank for containing machining fluid and having at least one side wall with an opening therein;
an arm unit positioned in said opening, said arm unit having a longitudinal axis and being movable with respect to said tank in two orthogonal directions, one of which is in a direction parallel to said one side wall and the other of which is in a direction parallel to the axis of said arm unit;
a plate member having a passageway sized to freely pass said arm unit;
means for providing a generally fluid-tight seal between said plate member and said arm unit; and
further comprising a first dam positioned on said arm unit and being operable for inhibiting particles produced during machining from traveling along said arm unit to said means for providing a generally fluid-tight seal.

27. The wire-cut electroerosion apparatus of claim 26, further comprising a second dam positioned on said arm unit on the opposite side of said means for providing a generally fluid-tight seal from said first dam, said second dam operable for inhibiting moisture on said arm unit from leaving said processing tank.

* * * * *